United States Patent [19]

Okada

[11] Patent Number: 5,852,468
[45] Date of Patent: Dec. 22, 1998

[54] 1-CHIP COLOR VIDEO CAMERA FOR GENERATING INTER-PIXEL COLOR SIGNAL COMPONENT BY INTERPOLATING PRIMARY COLOR SIGNALS FROM NEIGHBORING PIXELS

[75] Inventor: Hidefumi Okada, Daito, Japan

[73] Assignee: Sanyo Electric Co., Ltd., Japan

[21] Appl. No.: 604,482

[22] Filed: Feb. 21, 1996

[30] Foreign Application Priority Data

Feb. 27, 1995 [JP] Japan ................................. 7-038632

[51] Int. Cl.$^6$ ................ H04N 3/14; H04N 5/335; H04N 9/04; H04N 9/083
[52] U.S. Cl. .............................. 348/272; 348/280
[58] Field of Search .................... 348/272, 273, 348/280, 263, 625, 630, 717, 266, 268, 269, 277, 281, 282, 320, 321, 322, 323, 324, 624

[56] References Cited

U.S. PATENT DOCUMENTS

| | | | |
|---|---|---|---|
| 4,591,900 | 5/1986 | Heeb et al. ................................ | 358/44 |
| 4,716,455 | 12/1987 | Ozawa et al. ............................. | 358/44 |
| 5,280,351 | 1/1994 | Wilkinson ................................ | 358/140 |
| 5,552,827 | 9/1996 | Maenaka et al. ......................... | 348/266 |
| 5,581,298 | 12/1996 | Sasaki et al. ............................ | 348/222 |

FOREIGN PATENT DOCUMENTS 63-97078  4/1988  Japan.

*Primary Examiner*—Andrew I. Faile
*Assistant Examiner*—Christopher Onuaku
*Attorney, Agent, or Firm*—Michaelson & Wallace; Peter L. Michaelson

[57] ABSTRACT

A 1-chip color video camera which provides a frequency characteristic that exhibits relatively little attenuation up to a high frequency range for a (green) signal and has a highest degree of contribution to brightness, and hence provides high resolution. The 1-chip color video camera has a color separation circuit for processing signals obtained from a solid-state image sensor wherein primary color filters of R(red), G and B(blue) are arranged mosaic-wise for respective pixels. Color signal components at a central portion of a pixel block consisting of four pixels of two rows by two columns on the solid-state image sensor are generated by interpolating color signal components of a plurality of neighboring pixels.

14 Claims, 8 Drawing Sheets

FIG. 2 PRIOR ART

| B | G | B | G | B | G | B | G |
|---|---|---|---|---|---|---|---|
| G | R | G | R | G | R | G | R |
| B | G | B | G | B | G | B | G |
| G | R | G | R | G | R | G | R |
| B | G | B | G | B | G | B | G |
| G | R | G | R | G | R | G | R |
| B | G | B | G | B | G | B | G |
| G | R | G | R | G | R | G | R |

| G | R | G |
|---|---|---|
| B | G | B |
| G | R | G |

ARRANGEMENT H1

PRIOR ART
FIG. 3B

|   |   |   |
|---|---|---|
|   | 4 |   |
|   |   |   |

WEIGHT COEFFICIENT FOR G SIGNAL

PRIOR ART
FIG. 3C

|   | 2 |   |
|---|---|---|
|   |   |   |
|   | 2 |   |

WEIGHT COEFFICIENT FOR R SIGNAL

PRIOR ART
FIG. 3D

|   |   |   |
|---|---|---|
| 2 |   | 2 |
|   |   |   |

WEIGHT COEFFICIENT FOR B SIGNAL

PRIOR ART
FIG. 4A

| R | G | R |
|---|---|---|
| G | B | G |
| R | G | R |

ARRANGEMENT H2

PRIOR ART
FIG. 4B

|   | 1 |   |
|---|---|---|
| 1 |   | 1 |
|   | 1 |   |

WEIGHT COEFFICIENT FOR G SIGNAL

PRIOR ART
FIG. 4C

| 1 |   | 1 |
|---|---|---|
|   |   |   |
| 1 |   | 1 |

WEIGHT COEFFICIENT FOR R SIGNAL

PRIOR ART
FIG. 4D

|   |   |   |
|---|---|---|
|   | 4 |   |
|   |   |   |

WEIGHT COEFFICIENT FOR B SIGNAL

| B | G | B |
|---|---|---|
| G | R | G |
| B | G | B |

ARRANGEMENT H3

|  | 1 |  |
|---|---|---|
| 1 |  | 1 |
|  | 1 |  |

WEGHT COEFFICIENT FOR G SIGNAL

|  |  |  |
|---|---|---|
|  | 4 |  |
|  |  |  |

WEGHT COEFFICIENT FOR R SIGNAL

| 1 |  | 1 |
|---|---|---|
|  |  |  |
| 1 |  | 1 |

WEGHT COEFFICIENT FOR B SIGNAL

| G | B | G |
|---|---|---|
| R | G | R |
| G | B | G |

ARRANGEMENT H4

|  |  |  |
|---|---|---|
|  | 4 |  |
|  |  |  |

WEGHT COEFFICIENT FOR G SIGNAL

|  |  |  |
|---|---|---|
| 2 |  | 2 |
|  |  |  |

WEGHT COEFFICIENT FOR R SIGNAL

|  | 2 |  |
|---|---|---|
|  |  |  |
|  | 2 |  |

WEGHT COEFFICIENT FOR B SIGNAL

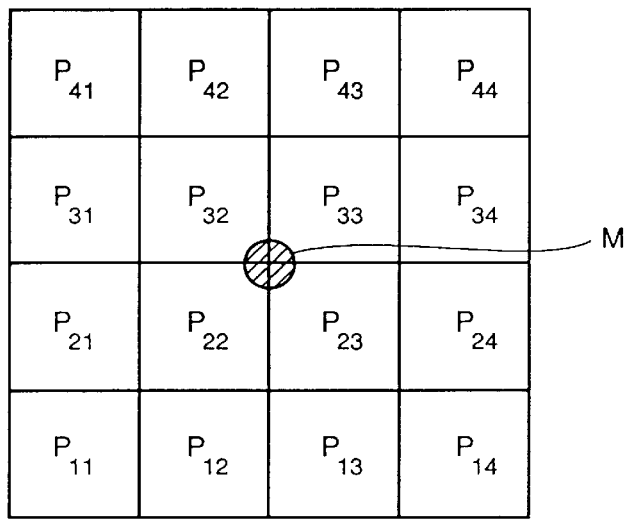

| G | R | G | R |
|---|---|---|---|
| B | G | B | G |
| G | R | G | R |
| B | G | B | G |

ARRANGEMENT 3

|   |   |   |   |
|---|---|---|---|
|   |   | 2 |   |
|   |   |   | 2 |
|   |   |   |   |

WEIGHT COEFFICIENT FOR G SIGNAL

|   |   | 1 |   |
|---|---|---|---|
|   |   |   |   |
|   | 2 |   | 1 |
|   |   |   |   |

WEIGHT COEFFICIENT FOR R SIGNAL

|   |   |   |   |
|---|---|---|---|
|   | 1 |   | 2 |
|   |   |   |   |
|   |   |   | 1 |

WEIGHT COEFFICIENT FOR B SIGNAL

| R | G | R | G |
|---|---|---|---|
| G | B | G | B |
| R | G | R | G |
| G | B | G | B |

ARRANGEMENT 4

|   |   |   |   |
|---|---|---|---|
|   |   | 2 |   |
|   | 2 |   |   |
|   |   |   |   |

WEIGHT COEFFICIENT FOR G SIGNAL

|   |   | 1 |   |
|---|---|---|---|
|   |   |   |   |
|   | 1 | 2 |   |
|   |   |   |   |

WEIGHT COEFFICIENT FOR R SIGNAL

|   |   |   |   |
|---|---|---|---|
|   | 2 |   | 1 |
|   |   |   |   |
|   |   | 1 |   |

WEIGHT COEFFICIENT FOR B SIGNAL

FIG. 16

| SELECTOR / ARRANGEMENT | ARRANGEMENT 1 | ARRANGEMENT 2 | ARRANGEMENT 3 | ARRANGEMENT 4 |
|---|---|---|---|---|
| SELECTOR 24 | b | a | a | b |
| SELECTOR 25 | b | a | a | b |
| SELECTOR 26 | a | b | b | a |
| SELECTOR 27 | a | b | b | a |
| SELECTOR 28 | b | a | a | b |
| SELECTOR 29 | a | b | b | a |
| SELECTOR 30 | a | b | b | a |
| SELECTOR 31 | b | a | a | b |
| SELECTOR 32 | b | b | a | a |
| SELECTOR 33 | b | b | a | a |
| SELECTOR 34 | a | a | b | b |
| SELECTOR 35 | a | a | b | b |
| SELECTOR 36 | a | a | b | b |
| SELECTOR 37 | b | b | a | a |

1-CHIP COLOR VIDEO CAMERA FOR GENERATING INTER-PIXEL COLOR SIGNAL COMPONENT BY INTERPOLATING PRIMARY COLOR SIGNALS FROM NEIGHBORING PIXELS

BACKGROUND OF THE INVENTION

1. Field of the Invention

The present invention relates to a color video camera. More specifically, the present invention relates to a 1-chip color video camera having a color separation circuit for processing signals from a solid-state image sensor in which primary color filters, that is, red, green and blue (hereinafter simply referred to as R, G and B) are arranged mosaic-wise.

2. Description of the Background Art

As disclosed in the Description of the Prior Art of Japanese Patent Laying-Open No. 63-97078 (H04N9/N7), a color video camera using 1-chip for primary colors includes a solid-state image sensor having a photoreceptor portion, a charge transfer portion and a transfer control portion.

On the photoreceptor portion, a mosaic microfilter is deposited.

More specifically, referring to FIG. 1, the photoreceptor portion 85 of solid-state image sensor 1 includes a plurality of photoelectric converting elements arranged in a matrix, and mosaic elements of the microfilter are correspondingly arranged for respective photoelectric converting elements. Namely, a microfilter corresponding to one color, for example, one of R, G and B is allotted to one photoelectric converting element. There are various combinations of filter arrangement of R, G and B in such a mosaic microfilter. One typical example has a combination in which odd numbered rows viewed from below includes GRGR . . . , and even numbered rows include GBGB . . . , as shown in FIG. 2. More specifically, filters corresponding to green, which requires high resolution, are arranged in black squares of a checker board, and R and B filters are arranged on white squares (hereinafter, referred to as checkerwise arrangement). In this case, rows including R filters and rows including B filters are alternately arranged. This arrangement is generally referred to as a Bayer type arrangement.

From respective pixels of the solid-state image sensor on which the microfilter is arranged as described above, color signals corresponding to the colors of associated color filters are output. The color signals are separated into R, G and B color signals respectively, by a color separation circuit in a succeeding stage.

FIG. 1 is a schematic block diagram showing a structure of the solid-state image sensor, that is, a charge coupled device (hereinafter referred to as CCD) 1.

CCD-1- includes a photoreceptor portion 85 having a plurality of photoelectric converting elements, for example, photodiodes, arranged in a matrix corresponding to respective pixels; a plurality of vertical transfer registers 83 receiving charges stored in the diodes corresponding to the incident light for transferring charges successively in vertical direction; a vertical driving circuit 81 for outputting a clock pulse voltage for controlling the operation of vertical transfer registers 83; a horizontal transfer register 84 for receiving charges transferred by respective vertical charge transfer registers for horizontally transferring and outputting signals by converting the successively transferred signal charges to a voltage; and a horizontal driving circuit 82 for generating a clock voltage for controlling the operation of the horizontal transfer register 84.

In other words, solid-state image sensor 1 has a structure of a so-called interline transfer CCD.

Therefore, in each pixel at photoreceptor portion 85, light intensity of incident light received through the corresponding microfilter is converted to an electrical signal, and output as a corresponding analog signal, row by row of pixels.

When the mosaic microfilter such as described above is used, only an R signal is obtained from the pixel on which an R filter is disposed, and G and B signals cannot be obtained. Therefore, the G and B signals of this pixel must be generated by interpolation from G and B signals of neighboring pixels.

In a so-called digital camera in which signals from a solid-state image sensor are digitized for further processing, interpolation of a missing signal has been performed by the following operation.

More specifically, in accordance with the arrangement of color filters, a two-dimensional missing signal interpolating digital filter performs weighting, using a weight coefficient predetermined for each pixel. More specifically, signals, of the same color as the missing signal, obtained from adjacent neighboring signals are multiplied by respective weight coefficients, and resulting multiplied values are added and then divided by a sum of all weight coefficients, that is, a so-called weighted means is calculated, so as to obtain a color signal which is of the same color as the missing signal.

FIG. 2 shows a pattern of arrangement of R, G and B of the mosaic microfilter of CCD 1-shown in FIG. 1. In the pattern shown in FIG. 2, there are four possible arrangements, that is, H1, H2, H3 and H4 shown in FIGS. 3A, 4A, 5A and 6A, respectively of color filters for a block of three pixels by three pixels with an arbitrary pixel positioned at the center.

FIG. 3A shows one (hereinafter referred to as arrangement H1) of four arrangements, in which a G filter is deposited on the central pixel. In this case, the G signal obtained from this pixel is multiplied by the weight coefficient of "4" as shown in FIG. 3B, and then it is divided by "4", so that the G signal is used as it is, as the G signal of the central pixel. As for the R signal, R signals obtained from upper and lower adjacent pixels on which R filters are deposited are multiplied by the weight coefficient of "2" respectively, as shown in FIG. 3C, and the value obtained by adding the R signals of the upper and lower pixels is divided by "4", whereby the R signal of the central pixel is generated. Further, as for the B signal, B signals obtained from left and right adjacent pixels on which B filters are arranged are multiplied by the weight coefficient of "2", respectively, as shown in FIG. 3D, and the value obtained by adding the B signals of the left and right pixels is divided by "4", whereby the B signal for the central pixel is generated.

FIG. 4(A) shows another (referred to as arrangement H2) of the four arrangements, in which a B filter is deposited on the central pixel. Therefore, as for the G signal, G signals obtained from upper, lower, left and right four pixels are multiplied by the weight coefficient of "1" as shown in FIG. 4B, and the value obtained by adding the G signals from these four pixels is divided by "4". Thus the G signal for the central pixel is generated. As for the R signal, R signals obtained from upper left, upper right, lower left and lower right four pixels are multiplied by the weight coefficient of "1", respectively, as shown in FIG. 4C, and the value obtained by adding the R signals from these four pixels is divided by "4", whereby the R signal for the central pixel is generated. As for the B signal, since a B filter is disposed on the central pixel, the B signal obtained from this pixel is multiplied by the weight coefficient of "4" as shown in FIG. 4D, and the resulting value is divided by "4", so that the B signal is used, as it is, as the B signal of the central pixel.

FIG. 5A shows a still another one (referred to as arrangement H3) of the four arrangements, in which an R filter is disposed on the central pixel. Therefore, as for the G signal, G signals obtained from upper, lower, left and right four pixels are multiplied by the weight coefficient of "1" as shown in FIG. 5B, and the value obtained by adding the G signals from these four pixels is divided by "4", whereby G signal of the central pixel is generated. As for the R signal, since an R filter is disposed on the central pixel, the R signal obtained from this pixel is multiplied by the weight coefficient of "4" as shown in FIG. 5C, and the resulting value is divided by "4". Thus the R signal is used, as it is, as the R signal for the central pixel. As for the B signal, B signals obtained from upper left, upper right, lower left and lower right four pixels are multiplied by the weight coefficient of "1", respectively, as shown in FIG. 5D, and the value obtained by adding the B signals from these four pixels is divided by "4", whereby the B signal for the central pixel is generated.

FIG. 6A shows still another one (referred to as arrangement H4) of the four arrangements, in which a G filter is disposed on the central pixel. As shown in FIG. 6B, the G signal obtained from the central pixel is multiplied by the weight coefficient of "4", and the resulting value is divided by "4", so that the G signal, as it is, is used as the G signal for the central pixel. As for the R signal, R signals obtained from left and right adjacent pixels on which R filters are disposed are multiplied by the weight coefficient of "2", respectively, as shown in FIG. 6C, and the value obtained by adding these R signals of the left and right pixels is divided by 4, whereby the R signal for the central pixel is generated. As for the B signal, B signals obtained from upper and lower adjacent pixels on which B filters are disposed are multiplied by the weight coefficient of "2", respectively, as shown in FIG. 6D, and the value obtained by adding the B signals of the upper and lower pixels is divided by "4", whereby the B signal for the central pixel is generated.

Such interpolation of color signals as described above is performed by means of an interpolation digital filter consisting of a two-dimensional FIR filter (Finite Impulse Response) filter.

The transfer function H (Z) of the FIR filter with respect to the aforementioned weight coefficients are as follows.

[ARRANGEMENT H1]
(HORIZONTAL & VERTICAL DIRECTIONS OF G SIGNAL)
$H(z)=\Sigma hmz^{-m}=1$
(HORIZONTAL DIRECTION OF R SIGNAL)
$H(z)=1$
(VERTICAL DIRECTION OF R SIGNAL)
$H(z)=\Sigma hmz^{-m}=1 \times z^{-0}+0 \times z^{-1}+1 \times z^{-2}=1+z^{-2}$
(HORIZONTAL DIRECTION OF B SIGNAL)
$H(z)=1+z^{-2}$
(VERTICAL DIRECTION OF B SIGNAL)
$Z(z)=1$

[ARRANGEMENT H2]
(HORIZONTAL & VERTICAL DIRECTIONS OF G SIGNAL)
$H(z)=\Sigma hmz^{-m}=1 \times z^{-0}+2 \times z^{-1}+1 \times z^{-2}=1+2z^{-1}+z^{-2}$
(HORIZONTAL & VERTICAL DIRECTIONS OF R SIGNAL) $H(z)=\Sigma hmz^{-m}=1 \times z^{-0}+0 \times z^{1}+1 \times z^{-2}=1+z^{-2}$
(HORIZONTAL & VERTICAL DIRECTIONS OF B SIGNAL) $H(z)=1$

[ARRANGEMENT H3]
(HORIZONTAL & VERTICAL DIRECTIONS OF G SIGNAL)
$H(z)=\Sigma hmz^{-m}=1 \times z^{-0}+2 \times z^{-1}1 \times z^{-2}=1+2z^{-1}+z^{-2}$
(HORIZONTAL & VERTICAL DIRECTIONS OF R SIGNAL) $H(z)=1$
(HORIZONTAL & VERTICAL DIRECTIONS OF B SIGNAL) $H(z)=1+z^{-2}$

[ARRANGEMENT H4]
(HORIZONTAL & VERTICAL DIRECTIONS OF G SIGNAL) $H(z)=1$
(HORIZONTAL DIRECTION OF R SIGNAL)
$H(z)=1+z^{-2}$
(VERTICAL DIRECTION OF R SIGNAL)
$H(z)=1$
(HORIZONTAL DIRECTION OF B SIGNAL)
$H(z)=1$
(VERTICAL DIRECTION OF B SIGNAL)
$H(z)=1+z^{-2}$

FIG. 7 is a graph showing characteristics of the interpolation filter as represented by the transfer functions above, in which the ordinate indicates gain of the interpolation filter, while the abscissa represents operational frequency of the interpolation filter. More specifically, for the image pick up signal sampled at a prescribed sampling time, the frequency plotted on the abscissa corresponds to a reciprocal of the period of spatial change in the picked-up image.

The characteristics of the interpolation filter as represented by the transfer functions above for each of the R, G and B color signals correspond to the curve P1, P2 and P3 shown in FIG. 7 with respect to the horizontal and vertical directions.

As for the arrangement H1shown in FIG. 3A, the G signal can be obtained from the pixel which is at the center both in the horizontal and vertical directions, and hence there is not the necessity of interpolation. Therefore, the characteristic is as represented by the curve P1, which is not dependent on frequency.

As for the R signal, the characteristic is as represented by the curve P1 in the horizontal direction, since interpolation from left and right pixels is not necessary. However, in the vertical direction, it is interpolated by using R signals of upper and lower adjacent pixels. Therefore, the characteristic is as shown by the curve P3 which lowers toward one half (hereinafter referred to as ½ Nyquist frequency) of Nyquist frequency Nq, which is the sampling frequency, and has an alias component in the frequency range higher than ½ Nyquist frequency.

Further, the B signal has the characteristic as represented by the curve P3 in the horizontal direction as it is interpolated by B signals from left and right pixels, and in vertical direction, the characteristic is as represented by the curve P1, since it is not interpolated from upper and lower adjacent pixels.

As for the arrangement H2 of FIG. 4A, the G signal in the horizontal direction has the characteristic as represented by the curve P2 in which gain of high frequency component lowers because of the characteristic of a two-dimensional FIR filter as the G signals of left and right adjacent pixels as well as upper and lower adjacent pixels contribute to interpolation. It has the characteristic as represented by the curve P2 also in the vertical direction, since G signals from upper and lower adjacent pixels as well as left and right adjacent pixels contribute to interpolation.

As for the R signal, there are no pixels contributing to interpolation in the central column, and hence in horizontal direction, it cannot help but depend on the left and right columns. Therefore, the characteristic is as shown by the curve P3. Similarly, in vertical direction, there is not a pixel contributing to interpolation in the central row, and hence it cannot help but depend on upper and lower rows. Therefore, it also has the characteristic as represented by the curve P3.

The B signal does not require interpolation, and hence it has the characteristic as represented by the curve P1 both in the horizontal and vertical directions.

The arrangement H3 shown in FIG. 5A will be described. As in arrangement H2, the G signal has the characteristic as represented by the curve P2 both in the horizontal and vertical directions.

The R signal, which needs no interpolation, has the characteristic as represented by the curve P1 both in the horizontal and vertical directions.

As for the B signal, it has the characteristic as represented by the curve P3 both in the horizontal and vertical directions, as does the R signal of arrangement H2.

The arrangement H4 shown in FIG. 6A will be described. The G signal, which needs no interpolation, has the characteristic as represented by the curve P1 both in the horizontal and vertical directions.

The R signal has the characteristic as represented by the curve P3 in the horizontal direction, and has the characteristic as represented by the curve P1 in the vertical direction, as does the B signal in arrangement H1.

Further, the B signal has the characteristic as represented by the curve P1 in the horizontal direction, and the characteristic as represented by the curve P3 in the vertical direction, as does the R signal of arrangement H1.

In this manner, in the conventional interpolation filter, R, G and B signals have filter characteristics different from each other in accordance with the arrangement of the color filters. If the gain of the interpolation filter at ½ Nyquist frequency much differs from the gain near the Nyquist frequency Nq in FIG. 7, there would be significant color moire near such frequencies.

In order to suppress such color moire in the 1-chip color video camera, an optical lowpass filter (LPF) is placed in an optical path of incident light to CCD 1. The optical lowpass filter removes high frequency component before sampling by the CCD 1, so as to reduce the alias component at the sampling, and hence color moire can be suppressed. However, that the high frequency component of the incident light that is removed induces, at the same time, lower resolution.

Further, dependent on the arrangement, the G signal, which among primaries, contributes most to brightness would have such a characteristic as represented by the curve P2 which suffers from significant attenuation in the high frequency range, which results in degraded resolution.

As for of color filters themselves, the color filter of three primaries such as described above but color filters of complementary colors may be used in lieu of the color filers of three primary colors such as described above. However, in view of color reproduction property, generally primary color filters are superior to complementary color filters. Therefore, a method in which color signals are interpolated by using color filters of primary colors, rather than complementary colors, is desirable.

SUMMARY OF THE INVENTION

An object of the present invention is to provide a 1-chip color video camera that provides a frequency characteristic that exhibits relatively little attenuation of gain up to a high frequency range, for the G signal which contributes, of three primary colors, most to brightness.

Another object of the present invention is to provide a 1-chip color video camera capable of minimizing difference between frequency characteristics of R and B signals and the frequency characteristic of the G signal.

A still further object of the present invention is to provide a 1-chip color video camera in which primary colors the same frequency characteristics for every pixel of the solid-state image sensor.

In summary, the present invention provides a 1-chip color video camera including a solid-state image sensor and an interpolating circuit.

The solid-state image sensor includes photoelectric converting elements, corresponding to respective pixels, arranged in an array. The solid-state image sensor includes a color filter array in which primary color filters are disposed in a prescribed arrangement, corresponding to the photoelectric converting elements, on a photoreceptor surface side. The interpolating circuit receives an output from the solid-state image sensor and outputs a corresponding color signal. The circuit includes a parallel color signal output circuit, a control circuit, and a color separation circuit. The parallel color signal output circuit receives output from the solid-state image sensor and successively outputs a color signal corresponding to a prescribed even number of rows of pixels column by column in parallel and in synchronization. The control circuit outputs a synchronized interpolation designating signal in accordance with correspondence between the color signals output column by column from the parallel color signal output circuit and the arrangement of predetermined weight coefficients for the prescribed arrangement of the color filter array. The color separation circuit receives outputs from the parallel color signal output circuit and, in accordance with the interpolation designating signal, performs interpolation of color signals from a pixel block including prescribed even numbered rows and prescribed even numbered columns of pixels, and outputs successively and, in synchronization, a color signal corresponding to the central position of the pixel block.

In accordance with another aspect, the 1-chip color video camera includes a solid-state image sensor and an interpolating circuit.

The solid-state image sensor includes photoelectric converting elements corresponding to respective pixels, arranged in an array. The solid-state image sensor includes a color filter array in which primary color filters are arranged mosaic-wise corresponding to the photoelectric converting elements, on a photoreceptor surface side. The color filter array includes, in a color filter arrangement of arbitrary two rows by two columns, green filters arranged in diagonal direction. The interpolating circuit receives an output from the solid-state image sensor and interpolates a green signal component at the central portion of a pixel block corresponding to the arbitrary color filter arrangement of two rows by two columns, by mean value of green signals obtained from photoelectric converting elements corresponding to the green filters arranged in the diagonal direction.

According to a still further aspect of the present invention, the 1-chip color video camera includes a solid-state image sensor and an interpolating circuit. The solid-state image sensor includes photoelectric converting elements, corresponding to respective pixels, arranged in an array. The solid-state image sensor includes a color filter array in which primary color filters are arranged mosaic-wise corresponding to the photoelectric converting elements, on a photoreceptor surface side. The color filter array includes red and blue filters arranged checkerwise, and rows including red filters and rows including blue filters are alternately arranged. The interpolation circuit interpolates each of red and blue color signal components at the central portion of a pixel block, based on the signals from the pixel block including 4 rows by 4 columns of pixels, that is, 16 pixels. The. interpolating circuit includes a two-dimensional non-recursive digital filter circuit for switching column-wise values of vertical sums of weight coefficients between (0, 3, 0, 1) and (1, 0, 3, 0), in accordance with the arrangement of color filters corresponding to the sixteen pixels.

According to a still further aspect of the present invention, the 1-chip color video camera includes a solid-state image sensor and an interpolating circuit.

The solid-state image sensor includes a color filter array in which primary color filters are arranged mosaic-wise corresponding to photoelectric converting elements on a photoreceptor surface side. The interpolating circuit generates a plurality of color signal components at a position shifted by half a pixel in horizontal and vertical directions from the center of an arbitrary pixel, based on color signal component of a plurality of neighboring pixels.

Therefore, an advantage of the present invention is that the G signal, which contributes most to brightness, exhibits a frequency characteristic that suffers relatively little attenuation up to the high frequency range; hence high resolution becomes possible.

Another advantage of the present invention is that generation of a color false signal is suppressed, since difference between the frequency characteristics of R and B signals and that of G signal is small at ½ Nyquist frequency.

A still another advantage of the present invention is that same frequency characteristics can be provided for every pixel with respect to each of the three primary colors.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a schematic diagram showing a structure of a mosaic filter disposed on a conventional CCD 1.

FIGS. 3A to 3D are illustrations showing allotment of weight coefficients for interpolation in a conventional color video camera, in which FIG. 3A shows filter arrangement H1, FIG. 3B shows an arrangement of weight coefficients for the G signal, FIG. 3C shows an arrangement of weight coefficients for the R signal and FIG. 3D shows an arrangement of weight coefficients for the B signal.

FIGS. 4A to 4D are illustrations showing allotment of weight coefficients for interpolation in a conventional color video camera, in which FIG. 4A shows filter arrangement H2, FIG. 4B shows an arrangement of weight coefficients for the G signal, FIG. 4C shows an arrangement of weight coefficients for the R signal and FIG. 4D shows an arrangement of weight coefficients for the B signal.

FIGS. 5A to 5D are illustrations showing allotment of weight coefficients for interpolation in a conventional color video camera, in which FIG. 5A shows filter arrangement H3, FIG. 5B shows an arrangement of weight coefficients for the G signal, FIG. 5C shows an arrangement of weight coefficients for the R signal and FIG. 5D shows an arrangement of weight coefficients for the B signal.

FIGS. 6A to 6D are illustrations showing allotment of weight coefficients for interpolation in a conventional color video camera, in which FIG. 6A shows filter arrangement H4, FIG. 6B shows an arrangement of weight coefficients for the G signal, FIG. 6C shows an arrangement of weight coefficients for the R signal and FIG. 6D shows an arrangement of weight coefficients for the B signal.

FIG. 7 is a graph showing frequency characteristics of three primary signals after interpolation in the conventional color video camera.

FIG. 9 shows a position of interpolation portion in a pixel block in accordance with one embodiment of the present invention.

FIGS. 10A to 10D are illustrations showing allotment of weight coefficients for arrangement 1 for interpolation in accordance with one embodiment of the present invention in which FIG. 10A shows filter arrangement, FIG. 10B shows arrangement of weight coefficients for the G signal, FIG. 10C shows arrangement of weight coefficients for the R signal, and FIG. 10D shows arrangement of weight coefficients for the B signal.

FIGS. 11A to 11D are illustrations showing allotment of weight coefficients for arrangement 2 for interpolation in accordance with one embodiment of the present invention in which FIG. 11A shows filter arrangement, FIG. 11B shows arrangement of weight coefficients for the G signal, FIG. 11C shows arrangement of weight coefficients for the R signal, and FIG. 11D shows arrangement of weight coefficients for the B signal.

FIGS. 12A to 12D are illustrations showing allotment of weight coefficients for arrangement 3 for interpolation in accordance with one embodiment of the present invention in which FIG. 12A shows filter arrangement, FIG. 12B shows arrangement of weight coefficients for the G signal, FIG. 12C shows arrangement of weight coefficients for the R signal, and FIG. 12D shows arrangement of weight coefficients for the B signal.

FIGS. 13A to 13D are illustrations showing allotment of weight coefficients for arrangement 4 for interpolation in accordance with one embodiment of the present invention in which FIG. 13A shows filter arrangement, FIG. 13B shows arrangement of weight coefficients for the G signal, FIG. 13C shows arrangement of weight coefficients for the R signal, and FIG. 13D shows arrangement of weight coefficients for the B signal.

FIG. 14 shows position of interpolation portion on the CCD in accordance with one embodiment of the present invention.

FIG. 16 shows switching control of a selector circuit in a color signal processing circuit 100 in accordance with one embodiment of the present invention.

DESCRIPTION OF THE PREFERRED EMBODIMENTS

Figure 8:
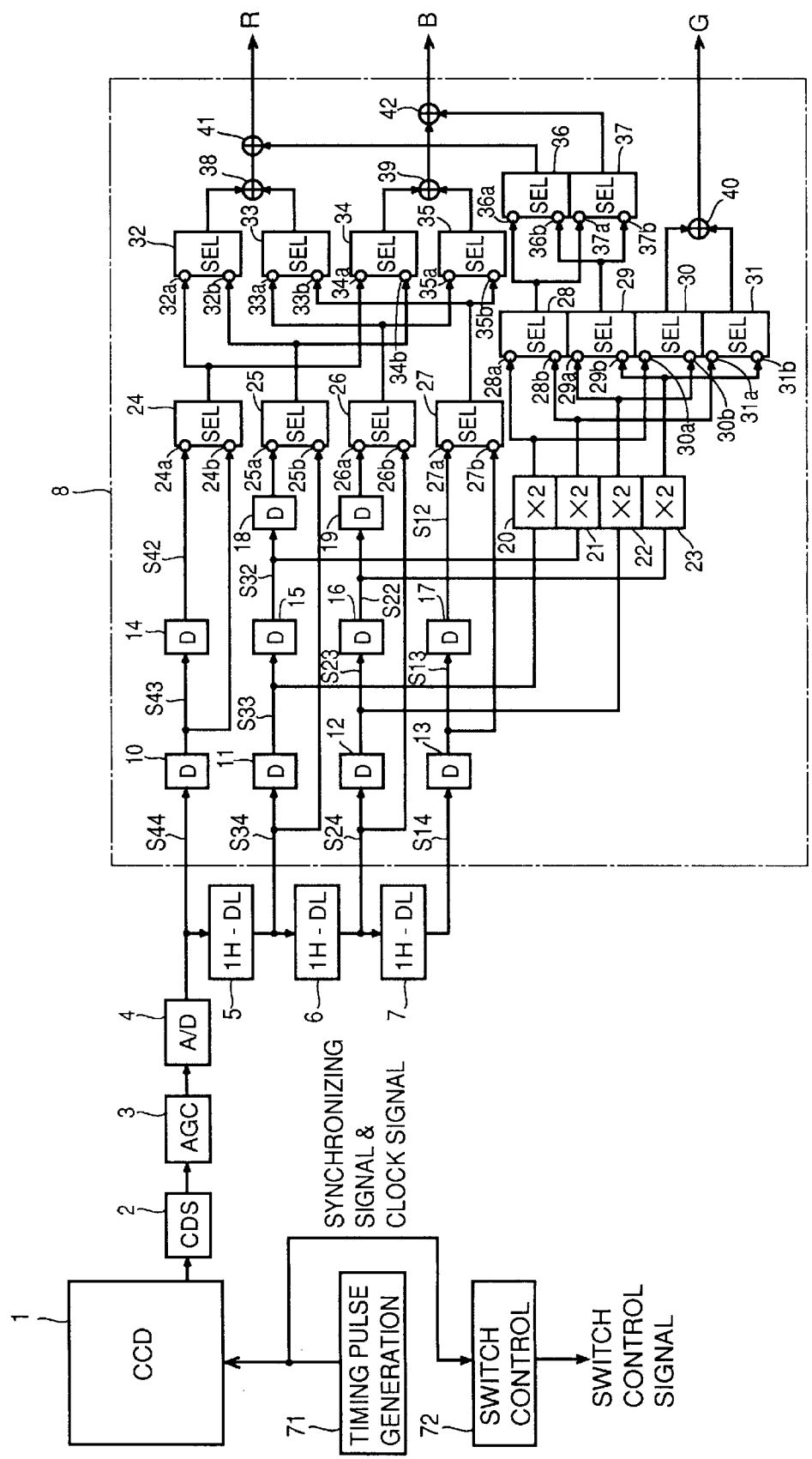
FIG. 8 is a block diagram showing a structure of a color signal processing circuit 100 in accordance with one embodiment of the present invention.

FIG. 8 is a block diagram showing a structure of a color signal processing circuit 100 including components from a CCD 1 as an image sensor up to a color separation circuit 8, in a color video camera in accordance with one embodiment of the present invention.

Figure 1:
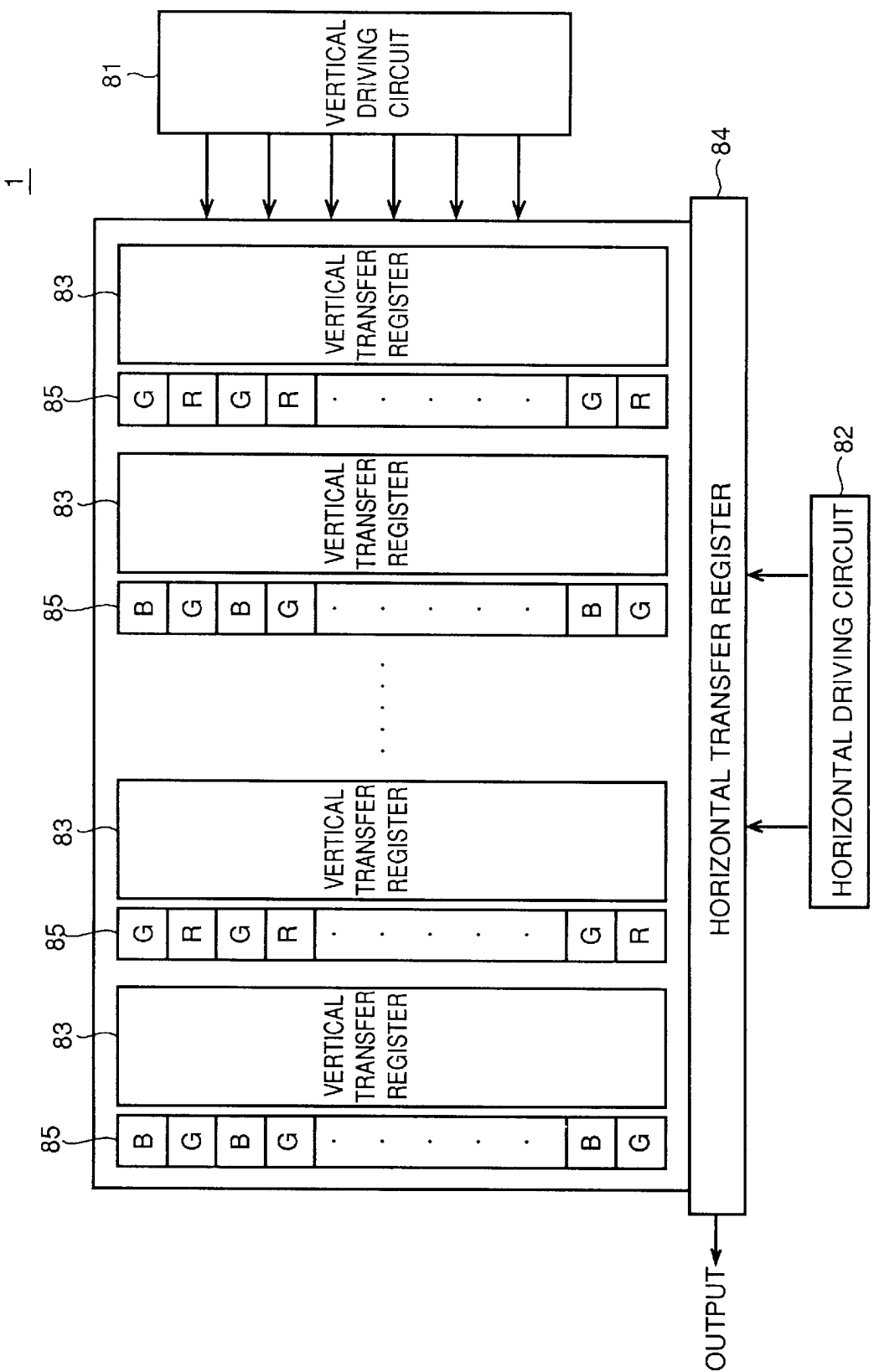
FIG. 1 is a schematic block diagram showing a structure of a conventional CCD 1.

The incident light is formed on CCD 1 by means of a lens (not shown), and photo-electrically converted to an image signal. A microfilter 70 including R, G and B color filters arranged mosaic-wise is provided on the photoreceptor surface of CCD 1. It is assumed that the arrangement of respective color filters of mosaic microfilter 70 is the same as the prior art example shown in FIG. 2. The light which has passed through the lens is supplied through microfilter 70 to photoreceptor portion of CCD-1. In accordance with the intensity of incident light received through the filter, charges stored in photoreceptor portion 85 (see FIG. 1) for one field period are transferred by vertical transfer register 83 and horizontal transfer register 84 to be output externally from CCD 1.

More specifically, CCD 1 includes photoreceptor portion 85; vertical transfer register 83 for vertically transferring an output in accordance with the light intensity received at photoreceptor portion 85; horizontal transfer register 84 arranged at a terminating end of the vertical transfer register for transferring charges transferred from the vertical transfer register in a horizontal direction; a vertical driving circuit 81 for receiving a vertical synchronizing signal, a horizontal synchronizing signal and a clock signal of a fixed frequency for outputting a vertical transfer pulse to cause vertical transfer register 83 to execute charge transfer; and a horizontal driving circuit 82 for receiving similar signals as vertical driving circuit 81 for outputting a horizontal transfer pulse for driving charge transfer by horizontal transfer register 84. In synchronization with the vertical synchronizing signal, an output corresponding to the light intensity received at photoreceptor portion 85 is read to vertical transfer register 83, and in the period of the horizontal synchronizing signal, charges are transferred vertically row by row in vertical transfer register 83. In accordance with the clock signal period, charges are transferred column by column in a horizontal direction in horizontal transfer register 84.

Such driving operation of the CCD 1 as described above is a well known operation for a so-called interline type CCD 1. The vertical and horizontal synchronizing signals as well as the clock signal are output from a timing pulse generating circuit 71 shown in FIG. 8.

Again referring to FIG. 8, the image signal output from CCD 1 is subjected to known noise removal operation in a correlated double sampling circuit (hereinafter referred to as CDS circuit) 2, amplified by an auto gain control circuit (hereinafter referred to as AGC circuit) 3, and converted to a digital signal in an A/D converter 4.

The digital image signal is applied as a first input signal directly to a color separation circuit 8, which is a two-dimensional non-recursive digital filter, as well as to a scan line delay provider (hereinafter referred to as 1H delay provider) 5. An output from 1H delay provider 5 is input as a second input signal to color separation circuit 8 as well as to a 1H delay provider 6 of a succeeding stage. Further, an output from 1H delay provider 6 is input as a third input signal to color separation circuit 8 as well as to a 1H delay provider 7 of a succeeding stage, and an output from 1H delay provider 7 is input, as a fourth input signal, to color separation circuit 8.

Therefore, the first to fourth four input signals correspond to image signals of four scanning lines (four lines), and the signals from the four lines are collectively input to color separation circuit 8.

Thus, an FIR (Finite Impulse Response) filter is implemented by color separation circuit 8 and three 1H delay providers 5, 6 and 7.

Color separation circuit 8 includes ten 1 clock delay providers 10, 11, 12, 13, 14, 15, 16, 17, 18, and 19 for providing a delay of 1 clock for the input signal; four multipliers 20, 21, 22, and 23 for multiplying the value of an input signal by 2; fourteen selectors 24, 25, 26, 27, 28, 29, 30, 31, 32, 33, 34, 35, 36 and 37 for selecting one of two input signals; and five adders 38, 39, 40, 41 and 42 for adding two input signals.

The structure will be more specifically described. The first input signal from A/D converter 4 is input to 1 clock delay provider 10, and the output from delay provider 10 is directly input to terminal 24b of selector 24 as well as to 1 clock delay provider 14. The output from 1 clock delay provider 14 is input to a terminal 24a of selector 24.

The second input signal which is an output signal from 1H delay provider 5 is directly input to a terminal 25b of selector 25, as well as to 1 clock delay provider 11. The output from 1 clock delay provider 11 is input to 1 clock delay provider 15 of the succeeding stage, as well as to multiplier 20. The output from 1 clock delay provider 15 is input to 1 clock delay provider 18 of the succeeding stage, as well as to multiplier 21. The output from 1 clock delay provider 18 is input to terminal 25a of selector 25.

The third input signal, which is the output from 1H delay provider 6 is directly input to terminal 26b of selector 26, as well as to 1 clock delay provider 12. The output from 1 clock delay provider 12 is input to 1 clock delay provider 16 of the succeeding stage as well as to multiplier 22. The output from 1 clock delay provider 16 is input to 1 clock delay provider 19 of the succeeding stage, as well as to multiplier 23. The output from 1 clock delay provider 19 is input to a terminal 26a of selector 26.

The fourth input signal, which is the output from 1H delay provider 7 is input to 1 clock delay provider 13. The output from delay provider 13 is directly input to a terminal 27b of selector 27 as well as to 1 clock delay provider 17. The output from 1 clock delay provider 17 is input to a terminal 27a of selector 27.

The output from selector 24 is input to terminals 32a and 34a of selectors 32 and 34, respectively, of the succeeding stage. The output from selector 25 is input to terminals 32b and 34b of selectors 32 and 34, respectively. The output from selector 26 is input to terminals 33a and 35a of selectors 33 and 35, respectively of the succeeding stage. The output from selector 27 is input to terminals 33b and 35b of selectors 33 and 35, respectively.

The output from multiplier 20 is input to terminals 28a and 30a of selectors 28 and 30, respectively, of the succeeding stage. The output from multiplier 21 is input to terminals 28b and 31a of selectors 28 and 31, respectively, of the succeeding stage. The output from multiplier 22 is input to terminals 29a and 30b of selectors 29 and 30, respectively, of the succeeding stage. The output from multiplier 23 is input to terminals 29b and 31b of selectors 29 and 31, respectively, of the succeeding stage.

The outputs from selectors 32 and 33 are added in adder 38 of the succeeding stage, and outputs from selectors 34 and 35 are added in adder 39 of the succeeding stage. The output from selector 28 is input to terminals 36a and 37a of selectors 36 and 37, respectively, of the succeeding stage. The output from selector 29 is input to terminals 36b and 37b of selectors 36 and 37, respectively, of the succeeding stage. The outputs from selectors 30 and 31 are added in adder 40.

The output from adder 38 is input, together with the output from selector 36, to adder 41, and added therein. The output from adder 39 is input, together with the output from selector 37, to adder 42, and added therein.

The output from adder 41 would finally be the R signal which has gone through color separation processing; the output from adder 42 would be the B signal, and the output from adder 40 would be the G signal.

In the above described flow of signal processing, it becomes possible to process signals of four successive pixels of a corresponding line, as three 1 clock delay providers are arranged in series for each input signal. Signals of a 4×4 pixel block can be handled if three 1 block delay providers are connected in series for each input signal. Switching of fourteen selectors is controlled in the following manner by a switch control signal from switch control circuit 72.

Assume that a 4×4 pixel block of CCD 1 includes 16 pixels represented by P11 to P44 as shown in FIG. 9, for example. Color separation circuit 8 generates R, G and B signals at the central portion M denoted by a hatched circle of the shown in FIG. 9 by interpolation of R, G and B signals from sixteen neighboring pixels.

More specifically, color separation circuit 8 generates R, G and B signals at a position obtained by shifting four central pixels of the 4×4 pixel block by half a pixel in horizontal and vertical directions, in other words, the position obtained by offsetting the four central pixels by half a pixel in horizontal and vertical directions, by using R, G and B signals from some of the neighboring sixteen pixels.

Consider sixteen pixels shown in FIG. 9. First, signals from lowermost one line of pixels are successively output from horizontal transfer register 84 of CCD 1 at every 1 clock, namely, P11 - → P12 - → P13 - → P14. When output of the signals of all the pixels in this line is completed, signals from pixels of the second lowest line are output, namely, P21 - → P22 - → P23 - → P24.

Thereafter, signals from the third from the bottom line are output, namely, P31 - → P32 - → P33 - → P34.

When the output of signals from the pixels of the third line from the bottom is completed, signals from respective pixels in the uppermost line are successively output, namely, P41 - →P42 - → P43 - → P44.

For convenience of description, in the following, the signal obtained by photoelectric conversion from pixel P11 will be denoted by S11, the signal from pixel P12 will be denoted by S12 and similarly, signals output from pixels up to P44 will be denoted by the reference characters up to S44.

The image signals S11 to S44 are passed through CDS circuit 2 and AGC circuit 3 and successively converted to digital values by A/D converter 4.

By the time the output of four lines is completed and the signal S44 from pixel P44 is output from A/D converter 4, one line of signals, that is image signals S11 to S14 are input to color separation circuit 8 from 1H delay provider 7, and one line of signals, that is, image signals S21 to S24 are input to color separation circuit 8 from 1H delay provider 6. Similarly, one line of signals, that is, image signals S31 to S34 are input to color separation circuit 8 from 1H delay provider 5, and one line of signals, that is, image signals S41 to S44 are directly input to color separation circuit 8.

Therefore, signal S12 is output from 1 clock delay provider 17, signal S13 is output from 1 clock delay provider 13, and signal S14 is output from 1H delay provider 7. Similarly, signals S21, S22 and S23 are output from 1 clock delay providers 19, 16 and 12, respectively, and signal S24 is output from 1H delay provider 6. Signals S31, S32 and S33 are output from 1 clock delay providers 18, 15 and 11, respectively, and signal S34 is output from 1H delay provider 5. Signals S42 and S43 are output from 1 clock delay providers 14 and 10, respectively, and signal S44 is output from A/D converter 4.

Figures 12A, 12B, 12C, 12D, 13A, 13B, 13C, 13D, 14:
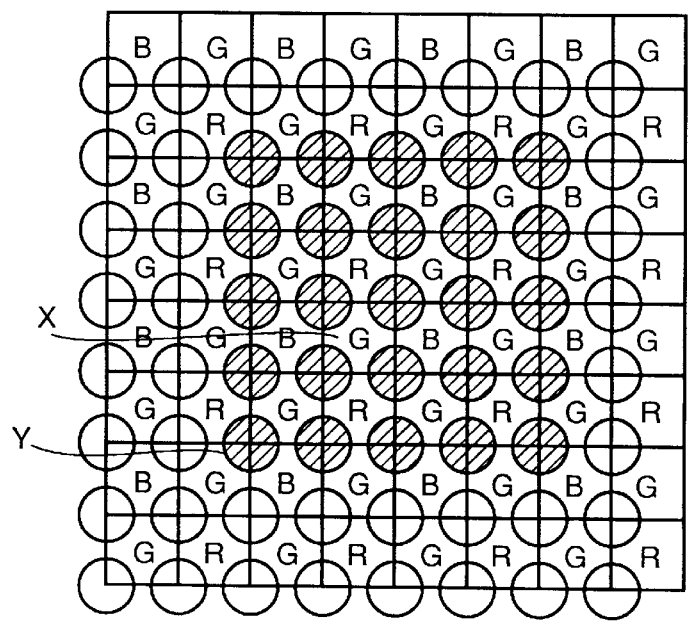

In the structure of color separation circuit 8 described above, in order to perform interpolation in color separation circuit 8, a pixel block consisting of 16 pixels, that is, 4×4, on CCD 1 must be set. FIG. 14 shows positions where interpolation takes place with respect to the arrangement of the mosaic color filter shown in FIG. 2. As already described, 4×4, that is, 16 pixels are necessary for interpolation. Therefore, as shown in FIG. 14, the result of interpolation when the image signals from pixels of lowermost three rows are output is meaningless. Further, interpolation at the time of output of first three pixels of the fourth row from the bottom is similarly meaningless. More specifically, the result of interpolation at interpolation portion Y comes to have meaning for the first time when the image signal of pixel X is obtained, in FIG. 14.

Therefore, switching control of respective selectors for interpolation must be started from the time point when the image signal from pixel X is output from CCD 1.

Here, there are four possible arrangements as shown in FIGS. 10 to 13 of 4×4=16 pixels for the microcolor filters shown in FIG. 14.

FIGS. 10A to 13A show arrangements of color filter arrays of 4×4=16 pixels. Figs. 10B to 13B show weight coefficients for respective pixels when the G signal at the central point is to be generated by interpolation. FIGS. 10C to 13C show weight coefficients for respective pixels when the R signal at the central position is to be generated by interpolation. FIGS. 10D to 13D show weight coefficients for respective pixels when the B signal at the central position is to be generated by interpolation.

Referring to FIG. 14, in the process of interpolation at interpolation portion Y performed as a G signal is read from pixel X, 16 pixels surrounding interpolation portion Y at the center would be as shown in FIG. 10A. Therefore, for the interpolation of interpolation portion Y, switching control appropriate for arrangement 1 of respective selector circuits becomes necessary.

When B signal is read from a pixel next to the pixel X in the right, interpolation at an interpolation portion adjacent to interpolation portion Y on the right becomes possible. The arrangement of sixteen pixels surrounding this interpolation portion corresponds to arrangement 2 and hence switch control appropriate for arrangement 2 of respective selector circuits becomes necessary.

Thereafter, as long as image signals are output from the pixels of this line, arrangement of sixteen pixels surrounding each interpolation portion would be arrangements 1 and 2 switched alternately. Therefore, relative to this switching, selectors must be controlled to be switched to the state suitable for the respective arrangements.

As for the next line, that is, a line above the line to which pixel S belongs, at a time point when R signal is read from the fourth from the left pixel, interpolation at an interpolation portion adjacent to interpolation portion Y on the line above becomes possible. The arrangement of sixteen pixels surrounding this interpolation portion corresponds to arrangement 3 shown in FIG. 12A. Therefore, selector circuits must be switched to be suitable for arrangement 3. Further, when reading of the G signal from the adjacent right pixel is completed, interpolation at interpolation portion adjacent to interpolation portion Y on upper right position becomes possible. The arrangement of sixteen pixels surrounding this interpolation portion corresponds to arrangement 4 shown in FIG. 13A. Therefore, selector circuits must be switched to be suitable for arrangement 4.

Thereafter, while the image signals are output from the pixels of this line, the arrangement of sixteen pixels surrounding the corresponding interpolation portions correspond to arrangements 3 and 4 switched alternately. Therefore, selector circuits must be controlled to be switched to suitable states for respective arrangements, correspondingly.

In the next row, after the point in time at which the image signal from the fourth pixel is input, switching control suitable for arrangements 1 and 2 is executed. Similarly, in the next row, after the point in time at which the image signal from the fourth pixel is input, switching control suitable for arrangements 3 and 4 is executed.

Thereafter, control for switching arrangements 1 and 2 alternately and arrangements 3 and 4 alternately for every other row is continued until reading of image signals from the pixels of the uppermost row is completed.

When reading of image signals of the one image plane is completed, stored charges at the photoreceptor portion are again read to the vertical register and reading from the lowermost line of pixels is again performed, similar switching control as described above is repeated.

In order to control switching of respective selectors as described above, actually, it is necessary to determine the position of the pixel on the CCD 1 from which image signal is being output, by means of a vertical counter and a horizontal counter included in switch control circuit 72 (see FIGS. 8 and 10A–13D).

The vertical counter is reset by the vertical synchronizing signal, counts the horizontal synchronizing signal and hence counts the line to which the pixel being processed belongs. The horizontal counter is reset by the horizontal synchronizing signal, counts the clock signals synchronized with horizontal transfer, and determines to which column in the horizontal direction the pixel being processed belongs. By these two counters, that is, vertical and horizontal counters, the position of the pixel from which an image signal is being output on the CCD 1 is determined. For example, if it is determined that the image signal from a pixel at the fourth row from the bottom and fourth column from the left is being output from CCD 1, switch control circuit 72 determines that the arrangement of 4×4=16 pixels used for interpolation corresponds to arrangement 1, and outputs a switch control signal corresponding to arrangement 1. As long as the output of pixels belonging to this line continues, switch control signals corresponding to arrangements 1 and 2 are output alternately in the period of clock signal.

If it is determined by the vertical and horizontal counters that the position on the CCD 1 of that pixel from which image signal is being output is the pixel at the fifth row from the bottom and fourth column from the left, switch control circuit 72 determines that the arrangement of 16 pixels used for interpolation corresponds to arrangement 3 and outputs a switch control signal corresponding to arrangement 3. As long as the output of image signals from pixels belonging to this line continues, switch control signals corresponding to arrangements 3 and 4 are output alternately in the period of the clock signal.

The image signal output from the corresponding pixel on the CCD 1 passes through CDS circuit 2, AGC circuit 3 and A/D converter 4, before it is input to color separation circuit 8. Therefore, after the delay of time necessary for these processings, the switch control signal is output from switch control circuit 72 to respective selector circuits. The clock signal is in synchronization with charge transfer by horizontal transfer register 84 of CCD 1, and it also serves as a driving clock of color separation circuit 8.

FIG. 16 shows correspondence between switch control signals from switch control circuit 72 and the arrangement of sixteen pixels.

In accordance with the corresponding pixel arrangement of the image signals input to color separation circuit 8, selector circuits 24 to 37 are switched to select their corresponding inputs (a or b) as shown in FIG. 16, and interpolated R, B and G signals are output from color separation circuit 8.

The color separation operation in the color separation circuit 8 described above is as follows, with reference to FIGS. 8–13D.

First, the procedure for generating G signal will be described. When a G signal is to be generated at interpolation portion Y which is the central portion of 4×4=16 pixels at which interpolation takes place, G signals obtained from two of four pixels surrounding interpolation portion Y are used.

More specifically, in the arrangement 1 shown in FIG. 10A and in the arrangement 4 shown in FIG. 13A, G signals from pixels P22 and P33 are multiplied by the weight coefficient of "2" as shown in FIGS. 10B and 13B, and the multiplied values are added, whereby the G signal at the interpolation portion Y is generated.

In the arrangement 2 shown in FIG. 11A and in the arrangement 3 shown in FIG. 12A, G signals from pixels P32 and P23 are allotted with weight coefficient of "2" as shown in FIGS. 11B and 12B, and similar calculation is performed to generate the G signal for the interpolation portion Y.

In the above described processing, interpolation is performed by a two-dimensional two-tap filter including 1 clock delay providers 11, 12, 15, 16, multipliers 20, 21, 22, 23, selector circuits 30, 31 and adder 40 in color separation circuit 8. More specifically, for the arrangements 1 and 4, selector 30 is switched to the side of terminal 30a by the switching signal, so that the output from multiplier 20 is selected, and selector 31 is switched to that terminal 31b to select the output from multiplier 23. The signal S33 which is the output from 1 clock delay provider 11 is multiplied by 2 in multiplier 20, and input to adder 40 by selector 30. Meanwhile, the signal S22 which is the output signal from 1 clock delay provider 16 is multiplied by 2 in multiplier 23, and input by selector 31 to adder 40. In adder 40, these inputs are added, and thus G signal at interpolation portion Y is generated.

Meanwhile, for the arrangements 2 and 4, switching is controlled such that selector 30 is switched to terminal 30b to select the output from multiplier 22, and selector 31 is switched to terminal 31a to select the output from multiplier 21. The signal S23 which is the output from 1 clock delay provider 12 is multiplied by 2 in multiplier 22 and input by selector 30, to adder 40. The signal S32 which is the output signal from 1 clock delay provider 15 is multiplied by 2 in multiplier 21 and input by selector 31, to adder 40. In adder 40, these inputs are added, whereby the G signal at the interpolation portion Y is generated.

More specifically, in interpolation processing of G signal, of 4×4 pixels, only the image signals from central 2×2 pixels are used to generate the G signal.

The procedure for generating R signal will be described.

When the R signal is to be generated at interpolation portion Y, one of the four pixels surrounding interpolation portion Y and two pixels of R color filters out of the outermost 12 pixels belonging to the same row or same column as this one pixel are used, that is, R signals from the total of three pixels are used.

More specifically, for the arrangement 1, the weight coefficient of "2" is allotted to the R signal from pixel P32 as shown in FIG. 10C, and weight coefficient of "1" is allotted to the R signals from pixels P12 and P34. R signals from these three pixels are multiplied by respective weight coefficients, and the multiplied values are added to provide the R signal of the central portion Y.

Similarly, for the arrangement 2, the weight coefficient of "2" is allotted to R signal from pixel P33 as shown in FIG. 1C, and weight coefficient of "1" is allotted to the R signals from pixels P13 and P31. The R signals from these three pixels are multiplied by respective weight coefficients, and the multiplied values are added to provide the R signal of the central portion For the arrangement 3, weight coefficient of "2" is allotted to R signal from pixel P22 and weight coefficient of "1" is allotted to the R signals from pixels P24 and P42, as shown in FIG. 12C. The R signals from these three pixels are multiplied by respective weight coefficients, and the multiplied values are added to provide the R signal at the central portion Y.

For the arrangement 4, weight coefficient of "2" is allotted to the R signal of pixel P23, and weight coefficient of "1" is allotted to the R signals from pixels P21 and P43, as shown in FIG. 13C. The R signals from these three pixels are multiplied by respective weight coefficients, and the multiplied values are added to provide the R signal at the central portion Y.

In this manner, when R signal is to be calculated by weighting and adding, a two-dimensional three-tap filter including all the 1 clock delay providers, multipliers 20, 21, 22 and 23, selector circuits 24, 25, 26, 27, 28, 29, 32, 33 and 36 and adders 38 and 41 of color separation circuit 8 is used.

More specifically, for the arrangement 1, selectors 27 and 36 are switched to their a terminals, respectively, and selectors 25, 28, 32 and 33 are switched to their b terminals, respectively. Therefore, the signal value S32 is multiplied by 2 in multiplier 21, and input through selectors 28 and 36 to adder 41. The signal value S12 is input through selectors 27 and 33 to adder 38. The signal value S34 is input through selectors 25 and 32 to adder 38. Therefore, from adder 38, a signal (S12+S34) is output. Finally, from adder 41, a signal (2×S32+S12+S34) would be output, which is the R signal at the interpolation portion Y.

For the arrangement 2, selectors 25, 28, and 36 are switched to their a terminals, respectively, and selectors 27, 32 and 33 are switched to their b terminals, respectively. Consequently, the signal value S33 is multiplied by 2 in multiplier 20, and input to adder 41 through selectors 28 and 36. The signal value S13 is input through selectors 27 and 33 to adder 38. Signal value S31 is input to adder 38 through selectors 25 and 32. Therefore, a signal (S13+S31) is output from adder 38. Finally, a signal (2×S33+S13+S31) would be output from adder 41, which is the R signal at interpolation portion Y.

For the arrangement 3, selectors 24, 32 and 33 are switched to their a terminals, respectively, and selectors 26, 29 and 36 are switched to their b terminals, respectively. Consequently, the signal value S22 is multiplied by 2 in multiplier 23 and input through selectors 29 and 36 to adder 41. The signal value S24 is input through selectors 26 and 33 to adder 38. The signal value S42 is input through selectors 24 and 32 to adder 38. Therefore, a signal (S24+S42) is output from adder 38. Finally, a signal (2×S22+S24+S42) would be output from adder 41, which is the R signal at the interpolation portion Y.

For the arrangement 4, selectors 26, 29, 32, and 33 are switched to their a terminals, respectively, and selectors 24 and 36 are switched to their b terminals, respectively. Consequently, the signal value S23 is multiplied by 2 in multiplier 22, and input through selectors 29 and 36 to adder 41. The signal value S21 is input to adder 38 through selectors 26 and 33. The signal value S43 is input through selectors 24 and 32 to adder 38. Therefore, a signal (S21+S43) is output from adder 38. Finally, a signal (2×S23+S21+S43) would be output from adder 41, which will be the R signal at interpolation portion Y.

The procedure for generating the B signal will be described in the following.

For generating the B signal at interpolation portion Y, one of the four pixels surrounding the interpolation portion Y and two pixels out of outermost 12 pixels belonging to the same row or same column as the one pixel, are used, that is, B signals from the total of these three pixels are used. More specifically, for the arrangement 1, weight coefficient of "2" is allotted to the B signal from pixel P23 and weight coefficient of "1" is allotted to the B signals from pixels P21 and P43 as shown in FIG. 10D. The B signals from these three pixels are multiplied by respective weight coefficients and the multiplied values are added, whereby the B signal of the interpolating portion Y is calculated.

Similarly, for the arrangement 2, weight coefficient of "2" is allotted to the B signal from pixel P22 and weight coefficient of "1" is allotted to the B signals from pixels P24 and P42, as shown in FIG. 11D. The B signals from these three pixels are multiplied by respective weight coefficients and the multiplied values are added, whereby the B signal at the interpolation portion Y is calculated.

For the arrangement 3, weight coefficient of "2" is allotted to the B signal from pixel P33 and weight coefficient of "1" is allotted to the B signals from pixels P13 and P31 as shown in FIG. 12D. The B signals from these three pixels are multiplied by respective weight coefficients, and the multiplied values are added, whereby the B signal at the interpolating portion Y is calculated.

For the arrangement 4, weight coefficient of "2" is allotted to the B signal from pixel P32 and weight coefficient of "1" is allotted to B signals from pixels P12 and P34, as shown in FIG. 13D. The B signals from these three pixels are multiplied by respective weight coefficients, and by adding these multiplied values, the B signal of the interpolating portion Y is calculated.

In this manner, when the B signal is to be calculated by weighting and adding, a two-dimensional three-tap filter including all the 1 clock delay providers, multipliers 20, 21, 22 and 23, selector circuits 24, 25, 26, 27, 28, 29, 34, 35, 37 and adders 39 and 42 of color separation circuit 8 is used.

More specifically, for the arrangement 1, selector circuits 26, 29, 34 and 35 are switched to their a terminals, respectively, and selector circuits 24 and 37 are switched to their b terminals, respectively. Therefore, the signal value S23 is multiplied by 2 in multiplier 22, and input through selectors 29 and 37 to adder 42. The signal value S21 is input through selectors 26 and 35 to adder 39. The signal value S43 is input through selectors 24 and 34 to adder 39. Therefore, a signal (S21+S43) is output from adder 39. Finally, a signal (2×S23+S21+S43) would be output from adder 42, which will be the B signal at interpolation portion Y.

For arrangement 2, selectors 24, 34, and 35 are switched to their a terminals, respectively, and selector circuits 26, 29 and 37 are switched to their b terminals, respectively. Consequently, the signal value S22 is multiplied by 2 in multiplier 23 and input to adder 42 through selector circuits 29 and 37. The signal value S24 is input through selector circuits 26 and 35 to adder 39. The signal value S42 is input through selector circuits 24 and 34 to adder 39. Therefore, a signal (S24+S42) is output from adder 39. Finally, a signal (2×S22+S24+S42) would be output from adder 42 which is the B signal at interpolation portion Y.

For the arrangement 3, selector circuits 25, 28 and 37 are switched to their a terminals, respectively, and selecting circuits 27, 34 and 35 are switched to their b terminals, respectively. Therefore, the signal value S33 is multiplied by 2 in multiplier 20 and input to adder 42 through selectors 28 and 37. The signal value S13 is input through selector circuits 27 and 35 to adder 39. The signal value S31 is input through selector circuits 25 and 34 to adder 39. Therefore, a signal (S13+S31) is output from adder 39. Finally, a signal (2×S33+S13+S31) would be output from adder 42, which is the B signal at interpolation portion Y.

For the arrangement 4, selector circuits 27 and 37 are switched to their a terminals, respectively, and selector circuits 25, 28, 34 and 35 are switched to their b terminals, respectively. Consequently, the signal value S32 is multiplied by 2 in multiplier 21, and input to adder 42 through selector circuits 28 and 37. The signal value S34 is input through selector circuits 25 and 34 to adder 39. Therefore, a signal (S12+S34) is output from adder 39. Finally, from adder 42, a signal (2×S32+S12+S34) would be output, which is the B signal at interpolating portion Y.

In the interpolation of R, G and B signals described above, it is also possible to utilize a weighted mean in which color signal values for each arrangement are divided by 4, i.e., the sum of weight coefficients.

In this manner, regardless of which of the four different arrangements corresponds to the arrangement of an arbitrary 4×4 pixel block on CCD 1, three primary signals of R, G and B can be calculated at interpolation portion Y of the pixel block in color separation circuit 8.

When generation of color signals at interpolation portion Y of a certain 4×4 pixel block is completed and image signal from the next pixel is output from A/D converter 4, the object pixel block is shifted by one pixel in horizontal direction, and similar processing is repeated. When this horizontal movement results in complete movement of one row in CCD 1, the pixel block of which interpolation is to be performed returns to the initial position horizontally while it is shifted by one pixel in vertical direction.

As the pixel block is shifted, the interpolation portion Y is also shifted in horizontal and vertical directions successively. Finally, as shown in FIG. 14, R, G and B signals at an intersection of four pixels on the CCD 1 are calculated. Here, the interpolation portion marked by the hatching in FIG. 14 indicates a central point of any pixel block if a 4×4 pixel block can be actually formed on the CCD 1.

Other than the hatched portion, it is possible to calculate values corresponding to R, G and B signals, based on the signals output from CCD 1 successively from color separation circuit 8. However, a 4×4 pixel block cannot be physically set on the CCD 1, and hence the calculated value is meaningless as data for interpolation.

Generally, on CCD 1, non-effective pixels which are not displayed on a monitor are arranged on left, right, upper and lower edges. Therefore, if the interpolation portions denoted by the hatched portions in FIG. 14 are used as effective pixels and portions not hatched are set as non-effective pixels, only the color signals obtained from the effective pixels would be visible signals.

In FIG. 14, the pixels of CCD 1 have been described as having a scale of 8×8 for convenience of description. Therefore, hatched portions are smaller as compared with portions not hatched. However, generally, the total number of pixels of a CCD 1 is as large as about 530×500, and most of the total number of pixels can be occupied by the hatched portions, that is, portions where 4×4 pixel blocks can be set. In other words, most pixels can be used as effective pixels.

The transfer function of a two-dimension non-recursive digital filter for performing interpolation of color signals in color separation circuit 8 in the above described manner are as follows.

[ARRANGEMENT 1]

(HORIZONTAL & VERTICAL DIRECTIONS OF G SIGNAL)
$H(z) = \Sigma hmz^{-m} = 1 \times z^{-0} + 1 \times z^{-1} = 1 + z^{-1}$ (HORIZONTAL DIRECTION OF R SIGNAL) $H(z) = \Sigma hmz^{-m} = 0 \times z^{-0} + 3 \times z^{-1} + 0 \times 0^{-2} + 1 \times 2^{-3} = 3z^{-1} + z^{-3}$ (VERTICAL DIRECTION OF R SIGNAL)
$H(z) = \Sigma hmz^{-m} = 1 \times z^{-0} + 0 \times z^{-1} 3 \times z^{-2} + 0 \times z^{-3} = 1 + 3z^{-2}$ (HORIZONTAL DIRECTION OF B SIGNAL $H(z) = \Sigma hmz^{-m} = 1 \times z^{-0} + 0 \times z^{-1} + 3 \times z^{-2} 0 \times z^{-3} = 1 + 3z^{-2}$ (VERTICAL DIRECTION OF B SIGNAL) $H(z) = \Sigma hmz^{-m} = 0 \times z^{-0} + 3 \times z^{-1} + 0 \times z^{-2} + 1 \times z^{-3} = 3z^{-1} + z^{-3}$

[ARRANGEMENT 2]

(HORIZONTAL & VERTICAL DIRECTIONS OF G SIGNAL)
$H(z) = \Sigma hmz^{-m} = 1 \times z^{-0} + 1 \times z^{-1} = 1 + z^{-1}$ (HORIZONTAL DIRECTION OF R SIGNAL)
$H(z) = \Sigma hmz^{-m} = 1 \times z^{-0} + 0 \times z^{-1} = 3 \times z^{-2} + 0 \times z^{-3} = 1 + 3z^{-2}$ (VERTICAL DIRECTION OF R SIGNAL)
$H(z) = \Sigma hmz^{-m} = 1 \times z^{-0} + 0 \times z^{-1} + 3 \times z^{-2} + 0 \times z^{-3} = 1 + 3z^{-2}$ (HORIZONTAL DIRECTION OF B SIGNAL)
$H(z) = \Sigma hmz^{-m} = 0 \times z^{-0} + 3 \times z^{-1} + 0 \times z^{-2} + 1 \times z^{-3} 3z^{-1} + z^{-3}$ (VERTICAL DIRECTION OF B SIGNAL) $H(z) = \Sigma hmz^{-m} = 0 \times z^{-0} 3 \times z^{-1} + 0 \times z^{-2} + 1 \times z^{-3} = 3z^{-1} + z^{-3}$

[ARRANGEMENT 3]

(HORIZONTAL & VERTICAL DIRECTIONS OF G SIGNAL)
$H(z) = \Sigma hmz^{-m} = 1 \times z^{-0} + 1 \times z^{-1} = 1 + z^{-1}$
$H(z) = \Sigma hmz^{-m} = 0 \times z^{-0} + 3 \times z^{-1} + 0 \times z^{-2} + 1 \times z^{-3} = 3z^{-1} + z^{-3}$ (VERTICAL DIRECTION OF R SIGNAL)
$H(z) = \Sigma hmz^{-m} = 0 \times z^{-0} + 3 \times z^{-1} + 0 \times z^{-2} + 1 \times z^{-3} = 3z^{-1} + z^{-3}$ (HORIZONTAL DIRECTION OF B SIGNAL)
$H(z) = \Sigma hms^{-m} = 1 \times z^{-0} + 0 \times z^{-1} + 3 \times z^{-2} + 0 \times z^{-3} = 1 + 3z^{-2}$ (VERTICAL DIRECTION OF B SIGNAL) $H(z) \Sigma hms^{-m} = 1 \times z^{-0} + 0 \times z^{-1} + 3 \times z^{-2} + 0 \times z^{-3} = 1 + 3z^{-2}$

[ARRANGEMENT 4]

Figure 15:
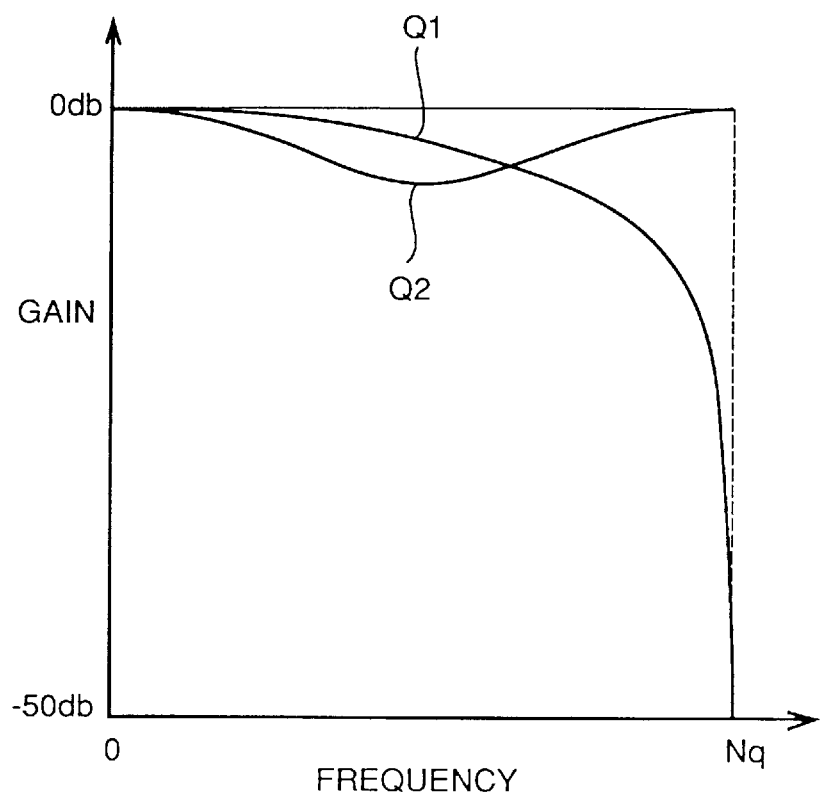
FIG. 15 shows frequency characteristics of three primary signals in accordance with one embodiment of the present invention.

(HORIZONTAL & VERTICAL SIGNALS OF G SIGNAL)
$H(z) = \Sigma hmz^{-m} = 1 \times z^{-0} + 1 \times z^{-1} = 1 + z^{-1}$ (HORIZONTAL DIRECTION OF R SIGNAL) $H(z) = \Sigma hmz^{-m} = 1 \times z^{-0} + 0 \times z^{-1} + 3 \times z^{-2} + 0 \times z^{-3} = 1 + 3z^{-2}$ VERTICAL DIRECTION OF R SIGNAL) $H(z) = \Sigma hmz^{-m} = 0 \times z^{-0} + 3 \times z^{-1} + 0 \times z^{-2} + 1 \times z^{-3} = 3z^{-1} + z^{-3}$ (HORIZONTAL DIRECTION OF B SIGNAL)
$H(z) = \Sigma hmz^{-m} = 0 \times z^{-0} + 3 \times z^{-1} + 0 \times z^{-2} + 1 \times z^{-3} = 3z^{-1} + z^{-3}$ (VERTICAL DIRECTION OF B SIGNAL)
$H(z) = \Sigma hmz - m = 1 \times z^{-0} + 0 \times z^{-1} + 3 \times z^{-2} + 0 \times z^{-3} = 1 + 3z^{-2}$ The frequency characteristics of color signals which are the output signals of the two-dimensional non-recursive digital filter having such transfer functions are as shown in FIG. 15. In the graph, the curve Q1 shows horizontal and vertical characteristics of G signal, and curve Q2 shows horizontal and vertical characteristics of R and B signals.

As is apparent from FIGS. 10B to 14B, the pixels used for generating the G signal exist at the central two columns out of four columns when viewed horizontally, and exist in the central two columns when viewed vertically. Therefore, in any of the arrangements 1 to 4, the gain lowers near the Nyquist frequency.

The sum of the weight coefficients of the pixels used for generating the R signal, when viewed horizontal, any of the central two columns out of four columns is "3", and in the column outer by one column, it would be "1". Meanwhile, when viewed vertically, either of the central two rows out of four rows is always "3", and an outer row spaced by one row is "1". Therefore, frequency characteristic of R signal is always as represented by Q2.

Similarly to R signals, the sum of the weight coefficients of the pixels used for generating the B signal is, when viewed horizontally, either of the central two of four columns is always "3" and an outer column spaced by one column is "1". When viewed vertically, it is always "3" in either of the central two rows out of four rows, and in the outer row spaced by one row, it is "1". Therefore, the frequency characteristic of the B signal is always as represented by Q2.

Figures 5A, 5B, 5C, 5D, 6A, 6B, 6C, 6D, 7:
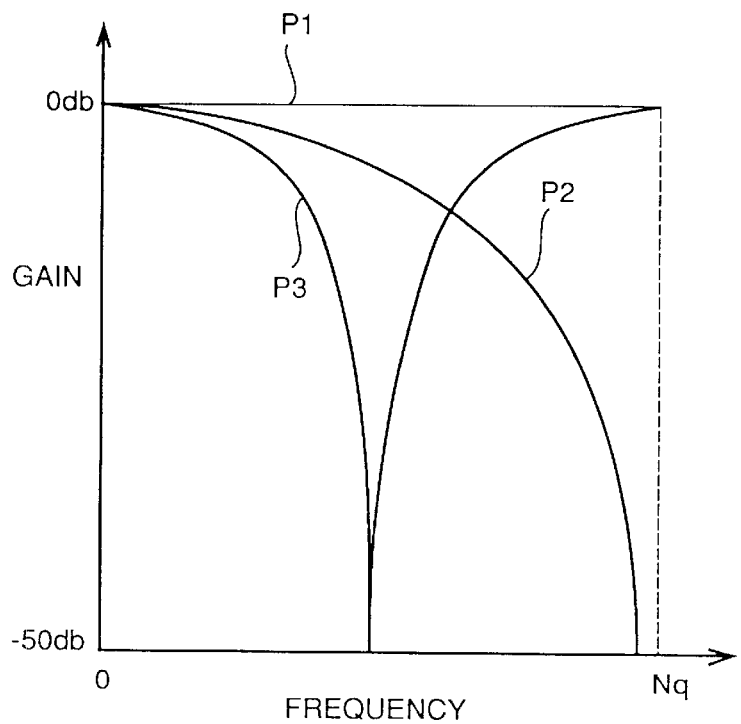

As is apparent from FIG. 15, the frequency characteristic Q1 of the G signal, which has highest contribution to brightness among then three primary signals, exhibits relatively little attenuation in the higher frequency range as compared with the curve P2 shown in FIG. 7, which means that higher resolution is possible.

Further, at ½ Nyquist frequency, the difference between frequency characteristic of R and B signals over the frequency characteristic of G signal is considerably smaller than in FIG. 7, and hence generation of a false color signal can be suppressed.

Therefore, according to the present invention, a frequency characteristic which exhibit relatively little attenuation in high frequency range can be provided for the G signal which has highest contribution to brightness, so that high resolution can be obtained. Further, at ½ Nyquist frequency, the difference between frequency characteristic of R and B signals and G signal is small, and hence generation of a false color signal can be suppressed. Further, the same frequency characteristic can be obtained for every pixel, for each of the three primary colors.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A 1-chip color video camera, comprising:

solid-state image sensing means provided with photoelectric converting elements corresponding to respective pixels arranged in an array;

said solid-state image sensing means including on its light receiving surface a color filter array in which primary color filters are placed in a prescribed arrangement corresponding to said photoelectric converting elements; and interpolating means, receiving an output from said solid-state image sensing means, for outputting color signals;

said interpolating means including:

parallel color signal output means, receiving said output from said solid-state image sensing means, for outputting, as said color signals, color signals corresponding to a prescribed even number of rows of said pixels in synchronization with and parallel to each other successively, column by column;

control means for outputting a synchronized interpolation designating signal in accordance with correspondence between said color signals, output column by column from said parallel color signal output means, and an arrangement of predetermined weight coefficients for the prescribed arrangement of said color filter array; and color separation means, receiving said outputs from said parallel color signal output means, for interpolating color signals from a pixel block including pixels of said prescribed even number of rows and a prescribed even number of columns in accordance with said interpolation designating signal, and for successively outputting color signals in synchronization with and corresponding to a central position of said pixel block.

2. A 1-chip color video camera, comprising:

solid-state image sensing means provided with photoelectric converting elements corresponding to respective pixels arranged in an array;

said solid-state image sensing means including on its light receiving surface a color filter array in which primary color filters are arranged mosaic-wise corresponding to said photoelectric converting elements;

said color filter array having green filters placed in a diagonal direction in an arbitrary color filter arrangement of two rows by two columns; and interpolating means, receiving an output from said solid-state image sensing means, for interpolating a green signal component at a central portion of a pixel block corresponding to said arbitrary color filter arrangement of two rows by two columns, using a mean value of a plurality of green signals from those of said photoelectric converting elements which correspond to said green filters placed in the diagonal direction.

3. A 1-chip color video camera, comprising:

solid-state image sensing means provided with photoelectric converting elements corresponding to respective pixels arranged in an array;

said solid-state image sensing means including, on its light receiving surface, a color filter array in which primary color filters are arranged mosaic-wise corresponding to said photoelectric converting elements; and said color filter array having red filters and blue filters arranged checkerwise, with rows including said red filters and rows including said blue filters being arranged alternately; and interpolating means for interpolating, based on signals from a pixel block including sixteen pixels of four rows by four columns, a color signal component of each of red and blue at a central portion of said pixel block;

said interpolating means including a two-dimensional non-recursive digital filter circuit for switching, in accordance with an arrangement of the color filters corresponding to said sixteen pixels, values of sums of weight coefficients of every column in a vertical direction to [0, 3, 0, 1] or [1, 0, 3, 0].

4. A 1-chip color video camera comprising:

solid-state image sensing means provided with photoelectric converting elements corresponding to respective pixels arranged in an array;

said solid-state image sensing means including, on its light receiving surface, a color filter array in which primary color filters are arranged mosaic-wise corresponding to said photoelectric converting elements; and said color filter array having red filters and blue filters arranged checkerwise, with rows including said red filters and rows including said blue filters being arranged alternately; and interpolating means for interpolating, based on signals from a pixel block including sixteen pixels of four rows by four columns, a color signal component of each of red and blue at a central portion of said pixel block;

said interpolating means including a two-dimensional non-recursive digital filter for switching, in accordance with an arrangement of the color filters corresponding to said sixteen pixels, values of sums of weight coefficients of every row in a horizontal direction to [0, 3, 0, 1] or [1, 0, 3, 0].

5. A 1-chip color video camera, comprising:

solid-state image sensing means provided with photoelectric converting elements corresponding to respective pixels arranged in an array;

said solid-state image sensing means including, on its light receiving surface, a color filter array in which primary color filters are arranged mosaic-wise corresponding to said photoelectric converting elements; and said color filter array having red filters and blue filters arranged checkerwise, with rows including said red filters and rows including said blue filters being arranged alternately; and interpolating means for interpolating, based on signals from a pixel block including sixteen pixels of four rows by four columns, a color signal component of each of red and blue at a central portion of said pixel block; and said interpolating means including a two-dimensional non-recursive digital filter circuit;

wherein when said pixel block of sixteen pixels includes sixteen pixels of four rows by four columns from (m, n) to (m+3, n+3) with m and n being integers; and said two-dimensional non-recursive digital filter circuit performs interpolation by:

setting a weight coefficient of a pixel (m+1, n+1) to 2 and a weight coefficient of each of pixels (m+1, n30 3) and (m+3, n+1) to 1, when either a red or a blue color filter is placed on the pixel (m+1, n+1);

setting a weight coefficient of a pixel (m+1, n+2) to 2 and a weight coefficient of each of pixels (m+1, n) and (m+3, n+2) to 1, when either a red or a blue color filter is placed on the pixel (m+1, n+2);

setting a weight coefficient of a pixel (m+2, n+1) to 2 and a weight coefficient of each of pixels (m, n+1) and (m+2, n30 3) to 1, when either a red or a blue color filter is placed on the pixel (m+2, n+1); and setting a weight coefficient of a pixel (m+2, n+2) to 2 and a weight coefficient of each of pixels (m, n+2) and (m+2, n) to 1, when either a red or a blue color filter is placed on the pixel (m+2, n+2).

6. The 1-chip color video camera according to claim 1, further comprising:

analog-to-digital converting means, receiving said output from said solid-state image sensing means, for outputting a corresponding digital signal thereto;

wherein said parallel color signal output means includes (2k-1) line memories, where 2k represents said prescribed even number;

each of said line memories having transfer capacity corresponding to a row of said pixels, and said line memories being connected in series to receive as an initial stage input, an output from said analog-to-digital converting means; and said parallel color signal output means outputs, in parallel, said output from said analog-to-digital converting means and outputs from said line memories; and said color separation means includes:

a two-dimensional transfer register, receiving said parallel color signal outputs, for successively transferring said parallel color signal outputs to a prescribed direction, and holding at most 2k×2k color signal values; and interpolation calculation means, responsive to said interpolation designating signal, for adding corresponding ones of said color signals held in said two-dimensional transfer register to each other, in accordance with an arrangement of said weight coefficients.

7. The 1-chip color video camera according to claim 6, wherein:

said color filter array includes green filters arranged in a diagonal direction in an arbitrary color filter arrangement of two rows by two columns; and said interpolation calculation means outputs, in accordance with said interpolation designating signal, a green signal corresponding to a central position of said pixel block as either a mean value of color signal values of (k, k) and (k+1, k+1) or a mean value of color signal values of (k+1, k) and (k, k+1), of the two-dimensional arrangement of said 2k×2k color signal values.

8. The 1-chip color video camera according to claim 6, wherein:

said prescribed even number is 4;

said color filter array includes red filters and blue filters arranged checkerwise, with rows including said red filters and rows including said blue filters being arranged alternately;

said two-dimensional transfer register holds signals from a pixel block including sixteen pixels of four rows by four columns; and said interpolation calculation means switches, in accordance with said interpolation designating signal, values of sums of weight coefficients in every column in a vertical direction for color signals corresponding to said sixteen pixels to [0, 3, 0, 1] or [1, 0, 3, 0], for interpolating and outputting color signal component of each of red and blue at a central portion of said pixel block.

9. The 1-chip color video camera according to claim 6, wherein:

said prescribed even number is 4;

said color filter array includes red filters and blue filters arranged checkerwise, with rows including said red filters and rows including said blue filters being arranged alternately;

said two-dimensional transfer register holds signals from a pixel block including sixteen pixels of four rows by four columns; and said interpolation calculation means for switching, in accordance with said interpolation designating signal, values of sums of weight coefficients of every row in horizontal direction for color signals corresponding to said sixteen pixels to [0, 3, 0, 1] or [1, 0, 3, 0], and for interpolating and outputting a color signal component of each of red and blue at a central portion of said pixel block.

10. The 1-chip color video camera according to claim 6, wherein:

said prescribed even number is 4;

said color filter array includes red filters and blue filters arranged checkerwise, with rows including said red filters and rows including said blue filters being arranged alternately;

said two-dimensional transfer register holds signals from a pixel block including sixteen pixels of four rows by four columns; and said interpolation calculation means performs interpolation in accordance with said interpolation designating signal, where said pixel block of 16 pixels includes sixteen pixels of four rows by four columns of (m, n) to (m+3, n30 3), by:

setting a weight coefficient of a pixel (m+1, n+1) to 2 and a weight coefficient of each of pixels (m+1, n30 3) and (m+3, n+1) to 1, when either a red or a blue color filter is placed on the pixel (m+1, n+1);

setting a weight coefficient of a pixel (m+1, n+2) to 2 and a weight coefficient of each of pixels (m+1, n) and (m+3, n+2) to 1, when either a red or a blue color filter is placed on the pixel (m+1, n+2);

setting a weight coefficient of a pixel (m+2, n+1) to 2 and a weight coefficient of each of pixels (m, n+1) and (n+2, n30 3) to 1, when either a red or a blue color filter is placed on the pixel (m+2, n+1); and setting a weight coefficient of a pixel (m+2, n+2) to 2 and a weight coefficient of each of pixels (m, n+2) and (m+2, n) to 1, when either a red or a blue color filter is placed on the pixel (m+2, n+2).

11. A 1-chip color video camera, comprising:

solid-state image sensing means provided with photoelectric converting elements corresponding to respective pixels arranged in an array;

said solid-state image sensing means, including on its light receiving surface a color filter array in which primary color filters are arranged mosaic-wise corresponding to said photoelectric converting elements; and interpolating means for generating each of a plurality of primary color signal components at a position shifted by half a pixel in horizontal and vertical directions from a center of an arbitrary pixel, from color signal components of a plurality of neighboring pixels, based on a predetermined weighted average of corresponding primary color signal components from a plurality of neighboring pixels to the center pixel and according to a prescribed arrangement of said color filter array.

12. A 1-chip color video camera, comprising:

solid-state image sensing means having color filters of three primary colors of R, G and B (red, green and blue, respectively) arranged mosaic-wise corresponding to respective pixels;

color separation means for processing a signal from said solid-state image sensing means;

said color separation means including signal processing means for performing weighted average processing to obtain a weighted average of R, G and B color signal components at a central position of a pixel block consisting of 16 pixels of 4 rows by 4 columns of (m, n) to (m+3, n30 3), where m and n are integers, using a prescribed weight coefficient for a signal from a prescribed pixel in said pixel block, wherein:

if a first value is larger than a second value, said weighted average processing is performed when:

i) the R or B color filter is arranged on a pixel at (m+1, n+1), and using a weight coefficient for the pixel (m+1, n+1) as the first value and a weight coefficient of pixels at (m+1, n30 3) and (m+3, n+1) as the second value;

ii) the R or B color filter is arranged on a pixel at (m+1, n+2), and using a weight coefficient for the pixel (m+1, n+2) as the first value and a weight coefficient of pixels at (m+1, n) and (m+3, n+2) as the second value;

iii) the R or B color filter is arranged on a pixel at (m+2, n+1), and using a weight coefficient for the pixel (m+2, n+1) as the first value and a weight coefficient of pixels at (m, n+1) and (m+2, n30 3) as the second value; and iv) the R or B color filter is arranged on a pixel at (m+2, n+2), and using a weight coefficient for the pixel (m+2, n+2) as the first value and a weight coefficient of pixels at (m, n+2) and (m+2, n) as the second value.

13. A 1-chip video camera, comprising:

solid-state image sensing means having color filters of three primary colors R, G and B (red, green and blue, respectively) arranged mosaic-wise corresponding to respective pixels; and interpolating means for generating R, G and B color signal data at a central position of a pixel block, the block consisting of an arbitrary v rows by v columns, where v is an even number, and using a prescribed weight coefficient for a signal for each color for a prescribed pixel in said pixel block.

14. A 1-chip color video camera according to claim 13, wherein said color filters comprises:

B color filters and G color filters arranged alternately for each of the pixels in one row of every two rows adjacent to each other in a vertical direction; and G filters and R filters arranged alternately offset by one pixel in the vertical direction from said one row, and on each one of the pixels of the other one of said two rows.

* * * * *